United States Patent [19]

Falkenstein et al.

[11] 4,035,313

[45] July 12, 1977

[54] MANUFACTURE OF SELF-EXTINGUISHING URETHANE GROUP-CONTAINING POLYISOCYANURATE FOAMS

[75] Inventors: Georg Falkenstein, Neustadt; Alfred Guthmann, Worms, both of Germany; John Hutchison, Trenton, Mich.; Peter Weyland, Ludwigshafen; Gerd Blinne, Freinsheim, both of Germany

[73] Assignee: BASF Aktiengesellschaft, Ludwigshafen, Germany

[21] Appl. No.: 601,940

[22] Filed: Aug. 4, 1975

[30] Foreign Application Priority Data

Aug. 9, 1974   Germany .......................... 2438369

[51] Int. Cl.² .................................. C08G 18/14
[52] U.S. Cl. ..................... 260/2.5 AN; 260/2.5 AJ; 260/2.5 AW

[58] Field of Search ............... 260/2.5 AJ, 2.5 AN, 260/2.5 AW

[56] References Cited

U.S. PATENT DOCUMENTS

| | | | |
|---|---|---|---|
| 3,003,977 | 10/1961 | Hurwitz et al. | 260/2.5 AN |
| 3,085,993 | 4/1963 | Peter et al. | 260/2.5 AN |
| 3,644,232 | 2/1972 | Bernard et al. | 260/2.5 AW |
| 3,922,238 | 11/1975 | Narayan et al. | 260/2.5 AW |

*Primary Examiner*—Eugene C. Rzucidlo
*Attorney, Agent, or Firm*—Keil, Thompson & Shurtleff

[57] ABSTRACT

Self-extinguishing urethane group containing polyisocyanurate foams are prepared by reacting a polyisocyanate with a polyesterol obtained by condensing an aliphatic dicarboxylic acid with a mixture of an aliphatic diol and N,N'-bis-(ethanol-2)-diaminooctachlorodiphenyl.

4 Claims, No Drawings

MANUFACTURE OF SELF-EXTINGUISHING URETHANE GROUP-CONTAINING POLYISOCYANURATE FOAMS

This invention relates to a process for the manufacture of self-extinguishing urethane group-containing polyisocyanurate foams from polyisocyanates and a polyesterol obtained from an aliphatic dicarboxylic acid, an aliphatic diol and a halo-substituted aromatic diol.

The manufacture of polyurethane foams by reacting an organic polyisocyanate with a polyol such as a polyesterol and/or polyetherol is well known. The range of application of such foams is greatly limited by their flammability. Attempts have been made to obviate this drawback by adding fillers such as antimony oxide, chlorinated compounds such as the Diels-Alder adduct of hexahalocyclopentadiene and maleic anhydride, polyvinyl chloride or phosphorus-halogen compounds such as tris-2-chloroethylphosphate, tris-(dichloropropyl)-phosphate and tris-(2,3-dibromopropyl)-phosphate.

However, the problem is solved only partially by these measures, since the flame resistance achieved is not durable due to the fact that the concentration of the additive falls in the course of time due to evaporation or lixiviation, or the degree of flame resistance is inadequate or the mechanical properties of the foams are markedly impaired by the formation of undesirable cracks and cavities.

The manufacture of urethane group-containing polyisocyanurate foams is also not new. Usually, polyisocyanates are cyclized and polymerized in the presence of auxiliaries and catalysts and the resulting isocyanate group-containing isocyanurates and polymers are reacted with polyols. It is sometimes advantageous to carry out the trimerization or polymerization at the same time. Polymeric foams of this kind have a high thermal stability but show only relatively poor flame resistance. In addition, the products are very brittle. This brittleness may be reduced by increasing the content of polyol but this has the drawback that the flame-resistant properties are also reduced.

It is an object of the present invention to provide polyisocyanurate foams showing a low degree of brittleness, a high tear resistance and a high thermal stability and flame resistance.

We have found that self-extinguishing urethane group-containing polyisocyanurate foams having said advantageous properties may be obtained by reacting polyisocyanates with polyols in the presence of catalysts, expanding agents and, if necessary, auxiliaries and additives, provided that the polyisocyanate and the polyol are reacted in proportions so as to give from 6 to 60 NCO groups in the reaction mixture per hydroxyl group of the polyol and that the polyol used is a polyesterol which has been prepared by condensing aliphatic dicarboxylic acids of from 4 to 12 carbon atoms and a diol mixture of substituted or unsubstituted and/or ether group-containing aliphatic diols having from 2 to 18 carbon atoms and halo-substituted aromatic diols of the formula

in which

A is a halo-substituted phenylene, naphthylene or diphenylene radical

R is a substituted or unsubstituted aliphatic radical of from 1 to 4 carbon atoms and containing at least one chemically combined hydroxyl group and R' is a hydrogen atom or a substituted or unsubstituted aliphatic radical of from 1 to 4 carbon atoms.

Surprisingly, the use of the above polyesterol in combination with the said proportions of polyisocyanate and polyesterol leads to polyisocyanurate foams which are characterized by a very low degree of brittleness, high thermostability, good tear resistance and excellent flame-resistant properties. These advantageous properties cannot be attained if only the polyisocyanate is reacted with any polyol in the said proportions, since the specific polyesterol mentioned, due to its content of aliphatic dicarboxylic acid and aliphatic diol, causes very little brittleness in the resulting polyisocyanurate foam and, on account of its content of halo-substituted, nitrogen-containing aromatic diol, produces excellent flame resistance.

Suitable isocyanates for the manufacture of the self-extinguishing, urethane group-containing polyisocyanurate foams of the invention are organic isocyanates, for example, aliphatic, cycloaliphatic and, preferably, aromatic isocyanates, having a functionality of at least two. As examples there may be mentioned aromatic polyisocyanates such as 2,4- and 2,6-toluylene diisocyanates, diphenylmethane diisocyanates, triphenylmethane triisocyanates, biphenyl diisocyanates, m- and p-phenylene diisocyanates and 1,5-naphthylene diisocyanates. We prefer to use crude and pure toluylene diisocyanates and mixtures of 2,2'-, 2,4'- and 4,4'-diphenylmethane diisocyanates and polyphenylpolymethylene polyisocyanates. The polyisocyanates may be used singly or in the form of mixtures. Further examples are aliphatic diisocyanates such as hexamethylene diisocyanate and decane diisocyanate and cycloaliphatic diisocyanates such as 4,4'-diisocyanatodicyclohexylmethane and isophorone diisocyanate.

Catalysts for the cyclization and polymerization of isocyanates are well known. As examples there may be mentioned strong bases such as quarternary ammonium hydroxides, for example benzyltrimethylammonium hydroxide; alkali metal hydroxides such as sodium or potassium hydroxide; and alkali metal alkoxides such as sodium methoxide and potassium isopropoxide; trialkylphosphines such as triethylphosphine; alkylaminoalkylphenols such as 2,4,6-tris-(dimethylaminomethyl)-phenol; 3- and/or 4-substituted pyridines such as 3- and 4-methylpyridines; organo-metallic salts such as tetrakis-(hydroxyethyl)-sodium borate; Friedel-Crafts catalysts such as aluminum chloride, iron (III) chloride, boron fluoride and zinc chloride and alkali metal salts of weak organic acids and nitrophenolates, for example potassium octoate, potassium 2-ethyl hexoate, potassium benzoate, sodium picrate and phthalimide potassium. We prefer to use the strongly basic N,N',N''-tris-(dialkylaminoalkyl)-s-hexahydrotriazines, for example the N,N',N''-tris-(dimethylaminopropyl)-s-hexahydrotriazine, N,N',N''-tris-(diethylaminopropyl)-s-hexahydrotriazine and N,N',N''-tris-(dimethylaminoethyl)-s-hexhydrotriazine.

It is in many cases advantageous to use, in addition to said cyclization and polymerization catalysts, compounds capable of catalyzing the formation of polyurethanes from polyols and polyisocyanates. Examples of suitable compounds are tertiary amines such as 1,4-diazabicyclo-(2,2,2)-octane and N,N-dimethylbenzylamine, specific organic metal compounds such as stannic octoate and dibutyltin laurate and mixtures of tertiary amines and tin compounds.

The most suitable amount of catalyst for the manufacture of the polyurethane foams of the invention depends on the efficiency of the catalyst concerned. In general, it has been found advantageous to use from 1 to 15 parts by weight and preferably from 3.5 to 10 parts by weight of catalyst for every 100 parts by weight of organic polyisocyanate.

One example of expanding agents which may be used in the process of the invention is water, which reacts with isocyanate groups to form carbon dioxide. Advantageous amounts of water are from 0.1 to 2%, based on the weight of polyisocyanate. Larger amounts of water may be used if desired, but preferably not when the thermal stability or the heat insulating properties are particularly important.

Other useful expanding agents are low-boiling liquids evaporating under the influence of the exothermic polymerization reaction. Suitable liquids are those which are inert to the organic polyisocyanate and which have boiling points not above 100° C at atmospheric pressure, preferably boiling points between −40° and +50° C. Examples of advantageously used liquids of this kind are halohydrocarbons such as methylene chloride, trichlorofluoromethane, dichlorodifluormethane, dichloromonofluoromethane, dichlorotetrafluoroethane and 1,1,2-trichloro-1,2,2-trifluoroethane. Mixtures of those low-boiling liquids with each other and/or other substituted or unsubstituted hydrocarbons may be used if desired.

The most suitable amount of low-boiling liquid for use in the preparation of semi-rigid and rigid foams depends on the foam density desired and also on the amount of water present, if used. In general, amounts of from 5 to 40% by weight, based on 100 parts by weight of organic polyisocyanate, give satisfactory results.

Auxiliaries and additives may be added to the reaction mixture if desired. As examples there may be mentioned stabilizers, hydrolysis protectants, pore-size controllers, fungicidal and antibacterial substances, dye, pigments, fillers, surface-active substances, softeners and flameproofing agents.

For example, surface-active substances may be used which assist in homogenizing the starting materials and which may also be suitable for controlling the cellular structure of the foams. As examples mention may be made of siloxane-oxyalkylene copolymers and other organopolysiloxanes, ethoxylated alkylphenols, ethoxylated fatty alcohols, paraffin oils, caster oil esters, ricinoleic acid esters and Turkey red oil.

It may also be advantageous to incorporate a softener into the reaction mixture to reduce the tendency of the products to brittleness. Conventional softening agents may be used, but is is particularly advantageous to use those agents which contain phosphorus and/or halogen atoms and thus increase the flame resistance of the polyurethane foams. Example of such agents are tricresyl phosphate, tris-2-chloroethyl phosphate, tris-chloropropyl phosphate and tris-2,3-dibromopropyl phosphate.

In addition to the aforementioned halo-substituted phosphates, antimony trioxide has been found to be a particularly good flameproofing agent, and it is therefore preferred to use antimony trioxide together with the polyesterol proposed by the invention for flameproofing the self-extinguishing urethane group-containing polyisocyanurate foams.

The essential features of the process of the invention for the manufacture of self-extinguishing urethane group-containing polyisocyanurate foams consist in that the polyisocyanate and polyol are reacted in such proportions that from 6 to 60 and preferably from 10 to 40 NCO groups are present in the reaction mixture for each hydroxyl group of the polyol and, in particular, that the polyol used is a polyesterol which has been obtained by condensing preferably one aliphatic dicarboxylic acid of from 4 to 12 carbon atoms and preferably of from 4 to 6 carbon atoms or, if desired, mixtures of said aliphatic dicarboxylic acid and a diol mixture of substituted or unsubstituted and/or ether group-containing aliphatic diols of from 2 to 18 carbon atoms and preferably of from 2 to 6 carbon atoms and halo-substituted aromatic diols of the formula

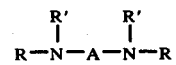

in which

A is a halo-substituted phenylene, naphthylene or, preferably, diphenylene radical, R is a substituted or unsubstituted aliphatic radical of from 1 to 4 carbon atoms and containing at least one chemically combined hydroxyl group and R' is a hydrogen atom or a substituted or unsubstituted aliphatic radical of from 1 to 4 carbon atoms. It will be appreciated that mixtures of the aliphatic or aromatic diols may be used. It is merely essential that the polyesterol used in the invention has been prepared from at least one aliphatic dicarboxylic acid and a diol mixture of at least one aliphatic diol and at least one nitrogen-containing halo-substituted aromatic diol.

Examples of suitable aliphatic dicarboxylic acids for use in the preparation of the polyesterols are glutaric acid, suberic acid, pimelic acid, azelaic acid, sebacic acid and, preferably, succinic acid and adipic acid. The dicarboxylic acids may be used singly or in the form of mixtures. It may in some cases be advantageous to prepare the polyesterols not from the dicarboxyic acids themselves but from corresponding dicarboxylic acid derivatives such as dicarboxylic esters having from 1 to 4 carbon atoms in the alcohol radical, dicarboxylic anhydrides or dicarboxylic chlorides.

Examples of substituted or unsubstituted and/or ether group-containing aliphatic diols are butanediol, hexanediol, neopentyl glycol and dibromonepentyl glycol. However, we prefer to use glycol, propylene glycol and ether group-containing diols such as diethylene glycol, dipropylene glycol and triethylene glycol. Depending on the properties desired, the aliphatic diols may be used singly or in the form of mixtures of various proportions.

Examples of the nitrogen group-containing halo-substituted, preferably chloro-substituted and/or bromo-substituted, aromatic diols of the formula

are the various isomeric N,N'-bis-(alkanol)-diaminooctachlorodiphenyls and N,N-bis-(alkanol)-diaminooctabromodiphenyls.

We prefer to use N,N'-bis-(ethanol-2)-diaminooctachlorodiphenyl obtained by condensing decachlorodiphenyl with monoethanolamine.

Manufacture of the polyesterols to be used in the invention is carried out by conventional methods. Depending on the dicarboxylic acid used and the composition of the diol mixture of aliphatic and halo-substituted aromatic diols, the polyesterols are liquid or solid and have varying contents of chlorine and/or bromine. In order to obtain polyesterols which are liquid at room temperature and which are thus readily processable, we prefer to carry out esterification with diol mixtures in which the molar ratio of halo-substituted aromatic diol to the substituted or unsubstituted and/or ether group-containing aliphatic diol is from 1:1.3 to 1:10 and preferably from 1:1.8 to 1:3. Particularly preferred polyesterols are for example condensates of adipic acid, N,N'-bis-(ethanol-2)-diaminooctachlorodiphenyl and diethylene glycol and/or ethylene glycol and/or propanediol-1,2.

The polyesterols to be used in the invention have molecular weights of from 800 to 3,000 and preferably from 800 to 2,000 and hydroxyl numbers of from 140 to 35 and preferably from 140 to 56.

The self-extinguishing isocyanate group-containing polyisocyanurate foams are prepared by the prepolymer process, preferably the one shot process. In such a process the polyesterols prepared in the above manner are thoroughly mixed with the polyisocyanates, catalysts, expanding agent and any auxiliaries and additives used in the specified proportions and the reaction mixture is then allowed to foam.

The self-extinguishing urethane group-containing polyisocyanurate foams produced in the present invention have densities of from 25 to 100 kg/m³ and preferably from 28 to 45 kg/m³ and are characterized by good mechanical properties and excellent thermostability and flame resistant. The products are preferably used as insulating materials, for example for refrigeration and building purposes, as upholstery materials for automobiles, aircraft and furniture and as shaped articles.

In the following Examples the parts and percentages are by weight.

Preparation of polyesterols

A mixture of ethylene glycol or propylene glycol or diethylene glycol, N,N'-bis-(ethanol-2)-diaminooctachlorodiphenyl and adipic acid is condensed in a nitrogen atmosphere at from 170° to 200° C in the molten phase. The temperature of the melt is raised at such a rate that the water of condensation distils off satisfactorily. When the major protion of water of reaction has distilled off and the distaillation temperature has dropped somewhat, the residual water is distilled off at 200° C and continuously reduced pressure, condensation being carried to the point at which the acid number of the polyesterol is less than 4 mg of KOH/g. The final vacuum is from 30 to 200 mm of Hg, its actual value being dependent on the aliphatic diol used; it is selected so as to prevent distillation of diol in the final phase of the condensation.

The nature and composition of the starting materials and the chemical data of the polyesterols obtained are listed in the following Table.

TABLE

| Polyesterols | Starting Materials | | | Hydroxyl Value (mg of KOH/g) | Acid Number (mg of KOH/g) | Cl Content (%) |
|---|---|---|---|---|---|---|
| A | adipic acid | 292 | parts | | | |
|   | diethylene glycol | 212 | parts | | | |
|   | N,N'-bis-(ethanol-2)-diaminooctachlorodiphenyl | 548 | parts | 95 | 2.4 | 29 |
| B | adipic acid | 1198 | parts | | | |
|   | diethylene glycol | 722 | parts | | | |
|   | N,N'-bis-(ethanol-2)-diaminooctachlorodiphenyl | 1753 | parts | 57 | 2.1 | 27 |
| C | adipic acid | 1169 | parts | | | |
|   | ethylene glycol | 410 | parts | | | |
|   | N,N'-bis-(ethanol-2)-diaminooctachlorodiphenyl | 1644 | parts | 53 | 0.2 | 29 |
| D | adipic acid | 1169 | parts | | | |
|   | diethylene glycol | 658 | parts | | | |
|   | N,N'-bis-(ethanol-2)-diaminooctachlorodiphenyl | 1698 | parts | 43 | 2.4 | 27 |
| E | adipic acid | 1169 | parts | | | |
|   | propanediol-1,2 | 601 | parts | | | |
|   | N,N'-bis-(ethanol-2)-diaminooctachlorodiphenyl | 1972 | parts | 91 | 3.3 | 30 |

EXAMPLE 1

The following mixture is added to 40 parts of polyesterol A with stirring at room temperature:
  10 parts of antimony trioxide,
  5.2 parts of N,N',N''-tris-(dimethylaminopropyl)-s-hexahydrotriazine,
  2.5 parts of siloxane-polyoxyalkylene copolymer,
  25 parts of trichlorofluoromethane and
  100 parts of a mixture of diisocyanatodiphenylmethanes and polyphenyl-polymethylene polyisocyanates.

The reaction mixture is then allowed to foam. There is obtained a urethane group-containing polyisocyanurate foam having a density of 36.8 kg/m³, a flexural strength of 3.75 kg/cm², a sag of 7.1 mm (DIN 53 452) and a compressive strength of 2.49 kg/cm². The product shows a low degree of brittleness and is self-extinguishing.

EXAMPLE 2

The following mixture is added to a mixture of 40 parts of polyesterol A and 22.5 parts of trifluoromethane with stirring at room temperature:

3.5 parts of N,N′,N″-tris-(dimethylaminopropyl)-s-hexahydrotriazine,
2.5 parts of a siloxane-polyoxyalkylene copolymer and 100 parts of a mixture of diisocyanatodiphenylmethanes and polyphenyl-polymethylene polyisocyanates.

The reaction mixture is then allowed to foam. There is obtained a urethane group-containing polyisocyanurate foam having a density of 34.8 kg/m$^3$, a flexural strength of 3.60 kg/cm$^2$, a sag of 9.0 mm (DIN 53 452) and a compressive strength of 2.68 kg/cm$^2$. The product shows a low degree of brittleness and is self-extinguishing.

EXAMPLE 3

The following mixture is added to a mixture of 30 parts of polyesterol B and 20 parts of trichlorofluoromethane with stirring at room temperature:
7.5 parts of antimony trioxide,
7 parts of N,N′,N″-tris-(dimethylaminopropyl)-s-hexahydrotriazine,
2 parts of a siloxane-polyoxyalkylene copolymer and
100 parts of a mixture of diisocyanatodiphenylmethanes and polyphenyl-polymethylene polyisocyanates.

The reaction mixture is then allowed to foam. There is obtained a urethane group-containing polyisocyanurate foam having a density of 36.0 kg/m$^3$, a flexural strength of 3.99 kg/cm$^2$, a sag of 5.00 mm (DIN 53 452) and a compressive strength of 2.29 kg/cm$^2$. The product shows a low degree of brittleness and is self-extinguishing.

EXAMPLE 4

To a mixture of
80 parts of polyester B,
80 parts of tris-$\beta$-chloroethyl phosphate,
8 parts of siloxane-polyoxyalkylene copolymer,
14 parts of N,N′N″-tris-(dimethylaminopropyl)-s-hexahydrotriazine and
100 parts of trichlorofluoromethane
there are added 400 parts of a mixture of diisocyanatodiphenylmethanes and polyphenyl-polymethylene polyisocyanates with stirring at room temperature. The reaction mixture is then allowed to foam.

There is obtained a urethane group-containing polyisocyanurate foam having a density of 31.8 kg/m$^3$, a flexual strength of 2.56 kg/cm$^2$, a sag of 3.8 mm (DIN 53 452) and a compressive strength of 1.7 kg/cm$^2$. The product shows a low degree of brittleness and is self-extinguishing.

EXAMPLE 5

20 parts of polyesterol C,
5 parts of antimony trioxide, 7 parts of N,N′,N″-tris-(dimethylaminopropyl)-s-hexahydrotriazine,
2 parts of siloxane-polyoxyalkylene copolymer,
20 parts of trichlorofluoromethane and
100 parts of a mixture of diisocyanatodiphenylmethanes and polyphenyl-polymethylene polyisocyanates are thoroughly mixed at room temperature. The reaction mixture is then allowed to foam. There is obtained a urethane group-containing polyisocyanurate foam having a density of 36 kg/m$^3$, a flexural strength of 2.81 kg/cm$^2$, a sag of 4.38 mm (DIN 53 452) and a compressive strength of 2.02 kg/cm2. The product is slightly brittle and is self-extinguishing.

EXAMPLE 6

80 parts of polyester D are reacted at 80° C with 400 parts of a mixture of diisocyanatodiphenylmethanes and polyphenylpolymethylene polyisocyanates. The following mixture is then added at room temperature with stirring:
80 parts of trichlorofluoromethane,
40 parts of N,N′,N″-tris-(dimethylaminopropyl)-s-hexahydrotriazine,
8 parts of siloxane-polyoxyalkylene copolymer and
20 parts of antimony trioxide.

The reaction mixture is then allowed to foam. There is obtained a urethane group-containing polyisocyanurate foam having a density of 35.5 kg/m$^3$, a flexural strength of 2.99 kg/cm$^2$, a sag of 5.3 mm (DIN 53 452) and a compressive strength of 1.86 kg/cm$^2$. The product shows a low degree of brittleness. It has a dimensional stability of 247° C and is self-extinguishing.

EXAMPLE 7

To a mixture of
160 parts of polyester E,
160 parts of tris-$\beta$-chloroethyl phosphate,
8 parts of siloxane-polyoxyalkylene copolymer,
12 parts of N,N′,N″-tris-(dimethylaminopropyl)-hexahydrotriazine and 120 parts of trichlorofluoromethane there are added 400 parts of a mixture of diisocyanatodiphenylmethanes and polyphenyl-polymethylene polyisocyanates at room temperature with stirring. The reaction mixture is then allowed to foam.

There is obtained a urethane group-containing polyisocyanurate foam having a density of 39.0 kg/m$^3$, a flexural strength of 2.45 kg/cm$^2$, a sag of 6.3 mm and a compressive strength of 2.09 kg/cm$^2$. The product shows a low degree of brittleness and is self-extinguishing.

COMPARATIVE EXAMPLE 1

The reaction of 40 parts of N,N′-bis-(ethanol-2-)-diaminooctachlorodiphenyl with 100 parts of a mixture of diisocyanatodiphenylmethanes and polyphenyl-polymethylene polyisocyanates gives a urethane group-containing prepolymer which is solid at room temperature and which is unsuitable for the preparation of polyisocyanurate foams.

COMPARATIVE EXAMPLE 2

To a mixture of 40 parts of a polyesterol of adipic acid, ethylene glycol and butanediol having an OH number of 56 and 20 parts of trichlorofluoromethane there is added the following mixture at room temperature with stirring:
7 parts of N,N′N″-tris-(dimethylaminopropyl)-s-hexahydrotriazine,
2 parts of siloxane-polyoxyalkylene copolymer and
100 parts of a mixture of diisocyanatodiphenylmethanes and polyphenyl-polymethylene polyisocyanates.

The reaction mixture is then allowed to foam. There is obtained a urethane group-containing polyisocyanurate foam having a density of 37.6 kg/m$^3$, a flexural strength of 3.47 kg/cm$^2$, a sag of 3.85 mm and a compressive strength of 2.85 kg/cm$^2$. The product shows a medium degree of brittleness and is readily flammable.

COMPARATIVE EXAMPLE 3

To a mixture of 10 parts of a chloroparaffin and 20 parts of a polyetherol of trimethylolpropane and propylene oxide and having an OH number of 374 there is added the following mixture at room temperature with stirring:

2.5 parts of antimony trioxide,
7 parts of N,N',N''-tris-(dimethylaminopropyl)-s-hexahydrotriazine,
2 parts of a siloxane-polyoxyalkylene copolymer
20 parts of trichlorofluoromethane and
100 parts of a mixture of diisocyanatodiphenylmethanes and polyphenyl-polymethylene polyisocyanates.

The reaction mixture is then allowed to foam. There is obtained a urethane group-containing polyisocyanurate foam having a density of 41.6 kg/m$^3$ and a chlorine content of 5% by weight. The product is readily flammable.

We claim:

1. A process for the manufacture of a self-extinguishing urethane group containing polyisocyanurate foam, which comprises reacting, in the presence of a trimerization catalyst and optionally a urethane catalyst, an expanding agent and optionally auxiliaries and additives, an organic polyisocyanate with a polyester polyol having a molecular weight of from 800 to 3000 and hydroxyl numbers of from 140 to 35 in a ratio of hydroxyl to isocyanate groups of from 1:6 to 1:60, said polyester polyol being obtained by the condensation of an aliphatic dicarboxylic acid of from 4 to 12 carbon atoms with a mixture of a substituted or unsubstituted aliphatic dihydric alcohol of from 2 to 18 carbon atoms which may contain ether groups an N,N'-bis-(ethanol-2)-diaminooctachlorodiphenyl in a molar ratio of from 1.3:1 to 10:1.

2. The process of claim 1, wherein the reaction is carried out in the presence of a trimerization catalyst and a urethane catalyst.

3. The process of claim 1, wherein the polyester polyol is a condensate containing divalent radicals of adipic acid, N,N-bis-(ethanol-2)-diaminooctachlorodiphenyl and a diol selected from the groups consisting of 1,2-propylene glycol, ethylene glycol and diethylene glycol.

4. The process of claim 1, wherein the organic polyisocyanate is an aromatic polyisocyanate selected from the group consisting of toluylene diisocyanate, methylenediphenyl diisocyanate, polyphenyl-polymethylene polyisocyanate and mixtures thereof.

* * * * *

UNITED STATES PATENT AND TRADEMARK OFFICE
CERTIFICATE OF CORRECTION

PATENT NO. : 4,035,313
DATED : July 12, 1977
INVENTOR(S) : Georg Falkenstein et al It is certified that error appears in the above—identified patent and that said Letters Patent are hereby corrected as shown below:

Column 10, line 9, "an" should read --and--.

Column 10, line 18, "groups" should read --group--.

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*